(12) United States Patent
Artz et al.

(10) Patent No.: US 9,114,939 B2
(45) Date of Patent: Aug. 25, 2015

(54) CASE TURNER CONVEYING SYSTEM

(71) Applicant: Intelligrated Headquarters, LLC, Mason, OH (US)

(72) Inventors: Ryan R. Artz, Mason, OH (US); Ryan E. Trimmer, Hamilton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 14/230,553

(22) Filed: Mar. 31, 2014

(65) Prior Publication Data

US 2014/0291114 A1    Oct. 2, 2014

Related U.S. Application Data

(60) Provisional application No. 61/806,910, filed on Mar. 31, 2013.

(51) Int. Cl.
| | |
|---|---|
| *B65G 13/12* | (2006.01) |
| *B65G 47/244* | (2006.01) |
| *B65G 47/24* | (2006.01) |
| *B65G 13/08* | (2006.01) |
| *B65G 47/64* | (2006.01) |
| *B65G 47/54* | (2006.01) |

(52) U.S. Cl.
CPC .............. *B65G 47/244* (2013.01); *B65G 13/08* (2013.01); *B65G 13/12* (2013.01); *B65G 47/24* (2013.01); *B65G 47/54* (2013.01); *B65G 47/643* (2013.01)

(58) Field of Classification Search
CPC ...... B65G 47/54; B65G 47/643; B65G 47/24; B65G 47/244; B65G 13/12; B65G 13/08

USPC ................ 198/369.6, 782; 193/35 R, 35 SS; 414/535

See application file for complete search history.

(56) References Cited

U.S. PATENT DOCUMENTS

| | | | |
|---|---|---|---|
| 3,823,811 A * | 7/1974 | Brockmuller ................. 198/382 |
| 3,921,789 A * | 11/1975 | Goldinger et al. ......... 198/369.6 |
| 6,406,014 B1 | 6/2002 | Reist |
| 6,505,733 B2 | 1/2003 | Troupos et al. |
| 6,644,459 B2 * | 11/2003 | van Leeuwen et al. .... 198/370.1 |
| 6,653,588 B1 | 11/2003 | Gillard-Hickman |
| 6,763,927 B2 * | 7/2004 | Itoh et al. .................... 198/370.1 |
| 7,178,659 B2 * | 2/2007 | Evans et al. .............. 198/370.09 |
| 8,684,169 B2 * | 4/2014 | Itoh et al. ....................... 198/597 |
| 2009/0314610 A1 * | 12/2009 | Hansl .......................... 198/468.6 |
| 2010/0200372 A1 * | 8/2010 | Krups et al. .................. 198/789 |
| 2013/0073518 A1 | 3/2013 | Srivastava et al. |

FOREIGN PATENT DOCUMENTS

| | | |
|---|---|---|
| EP | 0300122 | 1/1989 |
| WO | WO 97-14636 | 4/1997 |

OTHER PUBLICATIONS

International Search Report and Written Opinion dated Aug. 11, 2014 for Application No. PCT/US2014/032380.

* cited by examiner

*Primary Examiner* — Leslie A Nicholson, III (74) *Attorney, Agent, or Firm* — Frost Brown Todd LLC (57) ABSTRACT

A conveying system includes a case turner which selectively reorients selected articles or cases from an orientation to a desired orientation. The case turner includes a primary conveying path and a secondary conveying path which intersects with the primary conveying path. The conveying system may include a plurality of right angle transfer conveyors and an alternative conveying path for reject cases. A right angle transfer conveyor may be configured and controlled to reorient articles to a desired orientation.

6 Claims, 10 Drawing Sheets

CASE TURNER CONVEYING SYSTEM

This application claims priority from U.S. patent application Ser. No. 61/806,910, filed on Mar. 31, 2013, the entirety of which is incorporated herein by reference.

TECHNICAL FIELD

The present disclosure relates generally to material handling systems, and is more particularly directed to a subsystem of a material handling system that can angularly reorient selected conveyed articles relative to their direction of travel through the conveying system subsystem. The innovation will be disclosed in connection with, but not necessarily limited to, a case turner subsystem comprising a secondary conveying path onto which cases may be selectively diverted from a line of cases moving along a primary conveying path in a downstream direction of travel and inserted back into the line of cases in an angular orientation which is different from the initial angular orientation of the diverted cases. The disclosed case turner subsystem may be configured to maintain the original sequential order of the line of cases.

BRIEF DESCRIPTION OF THE FIGURES

The accompanying drawings together with specification, including the detailed description which follows, serve to explain the principles of the present invention.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Figure 1:
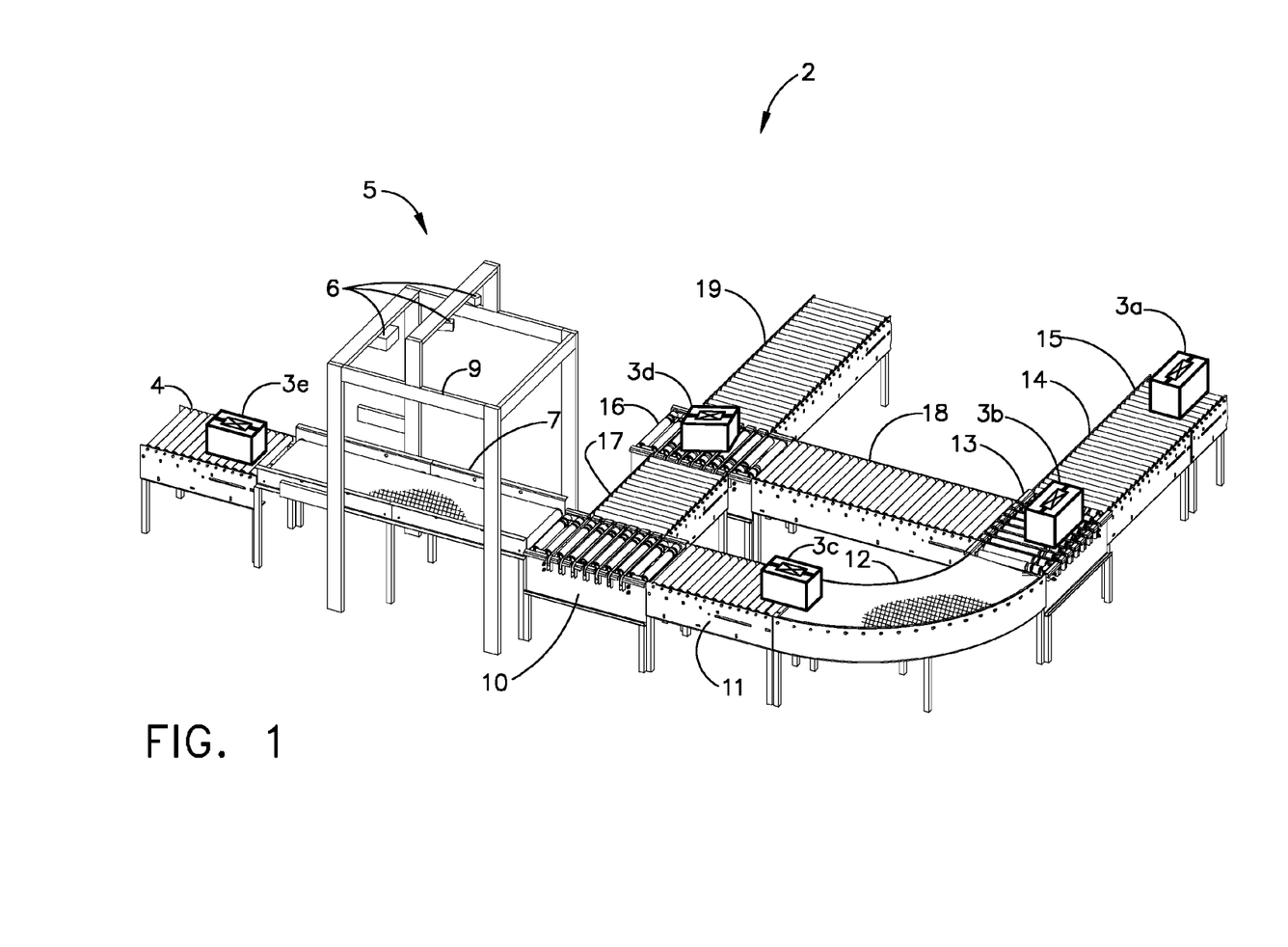
FIG. 1 is an isometric view of a case turner.

Referring to FIG. 1, conveying system 2, also referred to herein in as case turner subsystem 2, is configured to receive a plurality of cases 3 moving in a downstream direction, referred to herein also as the direction of travel, and to discharge each case 3 in a desired angular orientation relative to the direction of travel that is compatible with a downstream system 15, such as a rover or bot system. The case turner subsystem 2 may receive cases 3 in any orientation, such as for example, in one of two orientations, either with the longest side of the case 3 parallel to the direction of travel or with the longest side oriented ninety degrees to the direction of travel. In one embodiment, the case turner 3 can receive a plurality of cases 3 in an ordered sequence, and discharge the cases 3 in the same ordered sequence to the downstream system 15. Case turner 2 can also orient cases by aligning edges of the cases with a desired orientation, such as squaring or truing a skewed case by reorienting an edge to be parallel with the direction of travel. The case turner subsystem 2 may include a reject line 19 (FIG. 2) to eject cases 3 from the case turner subsystem 2 which have been determined should not be delivered to the downstream subsystem for any reason, as described below. As used herein, a reject case is a case which has have been determined should not be delivered to the downstream subsystem for any reason.

Referring to FIG. 1, case turner subsystem 2 comprises a primary conveying path along which the cases 3 move in a downstream direction (the direction of travel) oriented at a first angular orientation relative to the primary conveying path direction of travel, and a secondary conveying path onto which cases 3 may be selectively directed from the primary conveying path to travel along said secondary conveying path to be inducted back onto the primary conveying path at a second angular orientation relative to the primary conveying path direction of travel. In the embodiment depicted, the primary conveying path is defined by transfer conveyor 10, conveyor 11, conveyor 12, and transfer conveyor 13. In the embodiment depicted, the secondary conveying path is defined by transfer conveyor 10, conveyor 17, transfer conveyor 16, conveyor 18 and transfer conveyor 13. It is noted that the secondary conveying path intersects primary conveying path at a first end at transfer conveyor 10 and at a second end at transfer conveyor 13.

Conveyors 11, 14, 15, 17, 18 and 19 may be of any suitable configuration. The upstream conveyor 4 may be of any suitable configuration such as a belt conveyor or a live roller conveyor driven by any suitable means, such as by an underlying belt or comprising an MDR conveyor which, as is well known, has one or more motorized drive roller (MDR) which may, as is well known, be disposed to drive other rollers of the conveyor by individual drive elements such as O-bands engaging annular grooves in the rollers.

As seen in FIG. 1, case turning subsystem 2 may include a profiler 5 which includes conveyor 7 that receives cases from upstream conveyor 4 and discharges cases onto the primary conveying path, transfer conveyor 10 in the depicted embodiment. The upstream conveyor 4 may be of any suitable configuration such as a belt conveyor or a live roller conveyor driven by any suitable means, such as by an underlying belt or comprising an MDR conveyor. Conveyor 7 may also be of any suitable configuration, such as, as in the embodiment depicted, a belt conveyor, and driven by any suitable means. Profiler 5 includes scanning system 6, at least the imaging portion of which is carried by framework 9, which is configured to scan and to determine physical attributes of cases 3 cases disposed on conveyor 7. Scanning system 6 may read barcodes, determine the orientation of a case, measure the skew of a case, and measure the length, width and height of each case as it is conveyed by conveyor 7. Conveyor 7 may be of any suitable configuration, such as a belt conveyor as depicted, configured to move each case with the necessary precision to allow scanning system 6 to obtain accurate measurements. Conveyor 7 may move cases forward and backwards in starts and stops, without bounce and in a flat plane.

Scanning system 6, or another control system, may compare the physical attributes collected about a case on conveyor 7 to information in a data base, or to a data package delivered from an upstream control system to determine how to handle the case. If it is determined that the case has the desired angular orientation for delivery to the downstream system 15, the control system, diagrammatically represented at 20, of the case turner subsystem 2 will cause the case to advance along the primary conveying path to downstream system 15. Control system 20 comprises an interface to the case turner subsystem 2 and may comprise a processing system which performs operations by executing instructions to cause case turner subsystem 2 to function as described herein.

If it is determined that the case is not properly oriented for delivery to the downstream system 15, but has an angular orientation that can be adjusted by the case turner subsystem 2 to a desired angular orientation, the control system 20 will cause the case to advance along the secondary conveying path to be inducted into the primary conveying path. If it is determined that the case should not be delivered to the downstream subsystem for any reason, such as for example the case has an angular orientation that cannot be sufficiently adjusted by the case turner subsystem 2 or other issues with the physical attributes of the case, the control system 20 will cause the case to be advanced to the reject conveyor 19. Scanning system 6 can also be used to identify cases 3 for rejection. A reject case is identified by scanning system 6 and should not be delivered to the downstream subsystem for reasons such as but not limited to: a duplicate case 3, a misplaced case 3 that is not part of an order, or a case 3 that is highly skewed and needs to be kicked out or rejected.

In the embodiment depicted, conveyor 7 discharges cases immediately onto transfer conveyor 10, although there may be one or more conveyors interposed therebetween. The location of conveyor 7 immediately adjacent transfer conveyor 10 reduces the potential for a change in the angular orientation of a case between when it was scanned and when it reached the primary conveying path that could be caused by intermediate conveyors.

As used herein, the primary conveying path is the path along which cases travel without a change in their initial angular orientation, from which the cases are discharged in the orientation desired for the downstream system 15. It is noted that there may be angular reorientations of cases in or downstream of downstream system 15, but the primary conveying path is configured to deliver cases in the orientation desired for the infeed end of downstream system 15. As used herein, angular orientation is in reference to the direction of travel of the case: A case which travels along a curved conveyor such that its leading edge remains its leading edge has not had a change in its angular orientation, even though the orientation of the direction of travel has changed.

Figure 2:
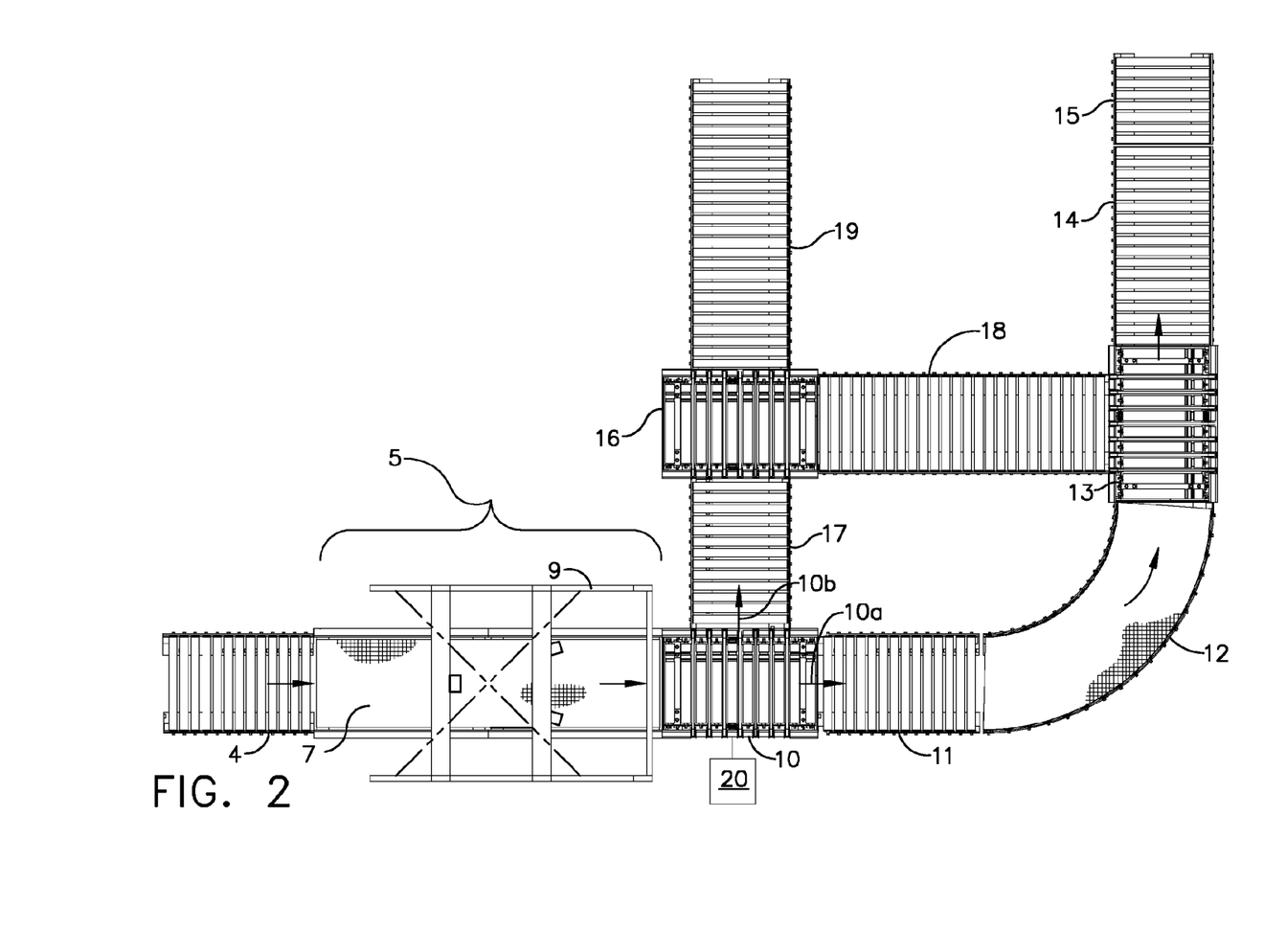
FIG. 2 is a top plan view of a case turner constructed in accordance with the teachings of the present innovation.
Figure 3:
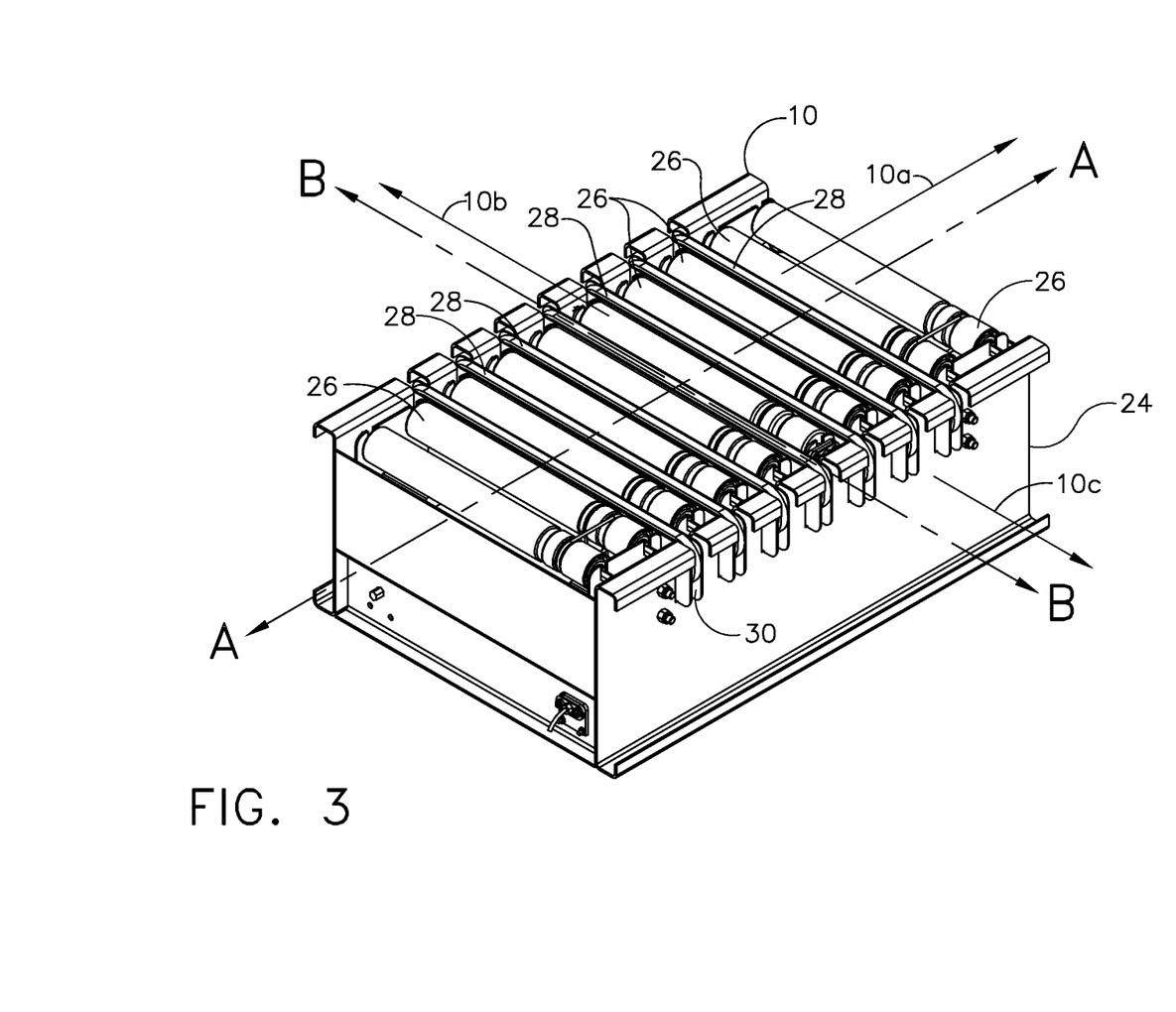
FIG. 3 is an isometric view of a transfer conveyor 10 of the case turner shown in FIG. 2.

Referring to FIG. 2, transfer conveyor 10 is the first conveyor defining the primary conveying path. Transfer conveyor 10 is configured to convey cases in one of two downstream directions—along the primary conveying path (a first path) as indicated by arrow 10*a* or along the secondary conveying path (a second path) as directed by arrow 10*b*. Transfer conveyor 10 may be of any suitable configuration to so direct cases. FIG. 3 illustrates a non-limiting embodiment of a configuration for transfer conveyor 10, which is described in detail in pending U.S. patent application Ser. No. 13/237,865, filed on Mar. 15, 2013, titled "Transfer Conveyor" by Randall T. Skanse et al, which is incorporated herein by reference in its entirety. In the depicted embodiment, transfer conveyor 10 comprises a plurality of spaced apart rollers 26 which define a first conveying surface disposed to advance cases along the primary conveying path in the direction of arrow 10*a*, and a plurality of spaced apart belts 28 disposed in the spaces 30 between the rollers 26 which define a second conveying surface disposed to advance cases along the secondary conveying path in the direction of arrow 10*b*. Belts 28 may also be configured to advance cases in the direction of arrow 10 *c* as discussed below in order to reorient cases by aligning edges of the cases with a desired orientation, such as squaring or truing a skewed case. In the embodiment illustrated, the first conveying surface and second conveying surface are oriented at a right angle to the other. The relative heights of the first and second conveying surfaces may be selectively controlled such that when a case is to be advanced along the primary conveying path in the direction of arrow 10*a*, the first conveying surface is actuated, engaging the case by being higher than the second conveying surface, and when a case is to be diverted from the primary conveying path onto the secondary conveying path in the direction of arrow 10*b*, the second conveying surface is actuated, engaging the case by being higher than the first conveying surface. Changing the relative heights of the first and second conveying surfaces may be accomplished by a coordinated raising and lowering of the rollers 26 and belts 28, or one conveying surface may be held at a fixed height while the other conveying surface is raised and lowered. For example, rollers 26 may be fixed in height and belts 28 moveable between a first height which is below the height of the first conveying surface defined by rollers 26 and a second height which is above the height of the first conveying surface.

In the depicted embodiment, the first conveying surface receives cases from conveyor 7, and may be, at least initially, disposed at the same level as the conveying surface of conveyor 7. If the case is to be advanced along the primary conveying path, rollers 26 remain above belts 28, engaged with the case and the case may be advanced downstream without stopping and discharged onto conveyor 11. If the case is to be diverted onto the secondary conveying path, the case may be stopped on transfer conveyor 10, and the relative heights of the first and second conveying surfaces changed such that the case is transferred to the second conveying surface, engaging belts 28. Belts 28 may be driven such that the case may be transferred to conveyor 17. The height of the second conveying surface may match the height of the conveying surface of conveyor 17.

In another embodiment, transfer conveyor 10 may be configured with a single conveying surface and a structure to push cases onto conveyor 17.

Figure 4:
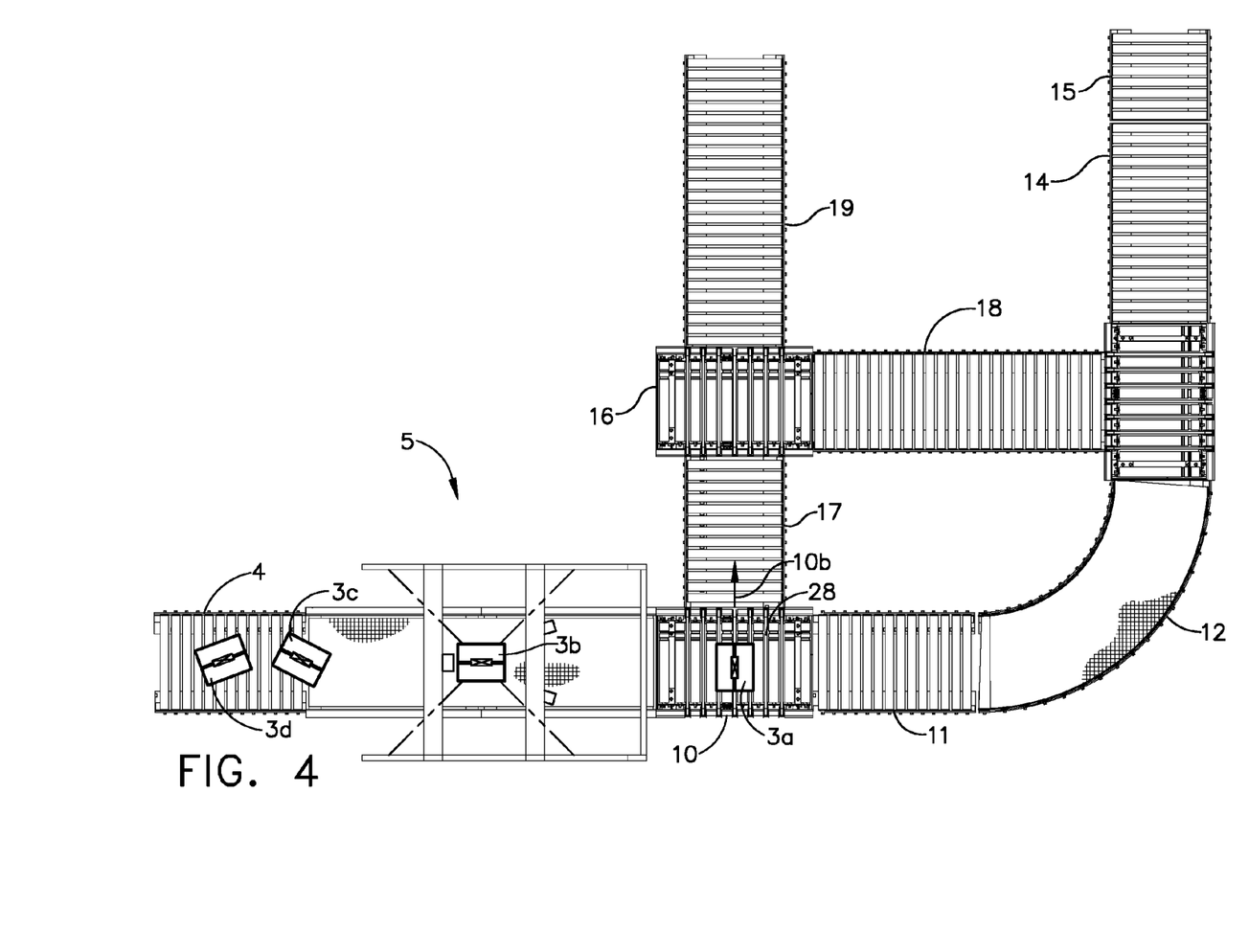
FIG. 4 is a top plan view of case turner loop of FIG. 2 showing case movement.
Figure 5:
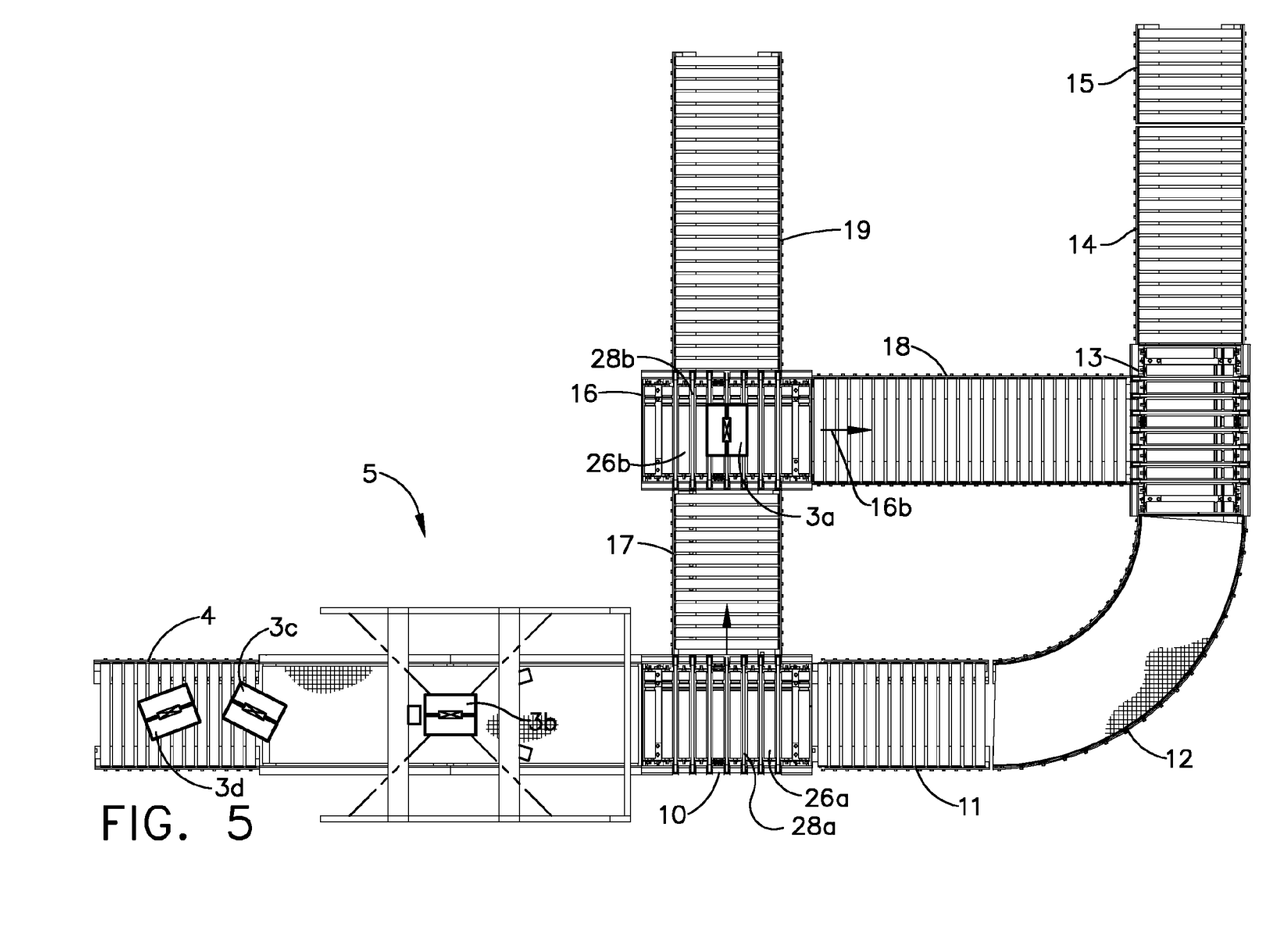
FIG. 5 is a top plan view of the case turner loop of FIG. 4 showing additional case movement.
Figure 6:
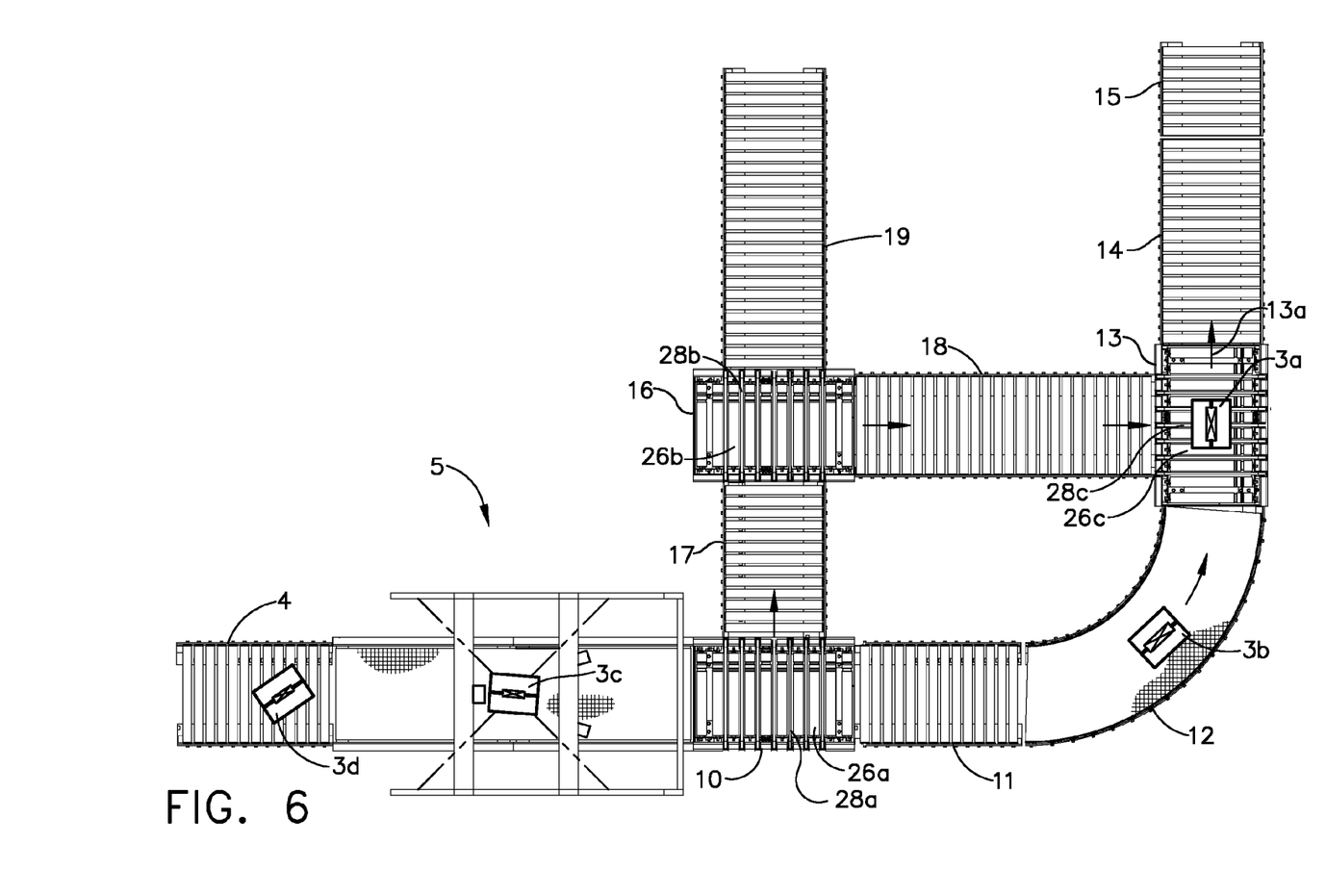
FIG. 6 is a top plan view of the case turner loop of FIG. 5 showing additional case movement.

FIG. 4 illustrates the diverting of case 3*a* from the primary conveying path to the secondary conveying path, with FIGS. 5 and 6 illustrating the subsequent travel of case 3*a* along the secondary conveying path until it is inducted back into the primary conveying path. In FIG. 4, case 3*a* is illustrated as having an initial angular orientation which is not the desired angular orientation for downstream system 15. (The desired angular orientation for case 3*a* can be seen in FIG. 8 as case 3*a* is discharged from the case turner subsystem 2 onto downstream system 15.) The control system 20 causes transfer case 10 to stop case 3a on the first upper conveying surface, generally in alignment with conveyor 17. Case 3a is then diverted by advancing it in the direction of arrow 10b onto the secondary conveying path, as a result of belts 28 engaging and advancing case 3a. It is noted that upon initiation of movement of case 3a in the direction of arrow 10b, the angular orientation of case 3a has changed by ninety degrees clockwise (from the top) from its initial angular orientation along the primary conveying path. Case 3a is discharged by transfer conveyor 10 onto conveyor 17, which advances case 3a along the secondary conveying path and discharges it onto transfer conveyor 16.

FIG. 5 illustrates case 3a completely on transfer conveyor 16, aligned with conveyor 18. In the embodiment depicted, transfer conveyor 16 has the same construction as transfer conveyor 10, but it may be of any suitable configuration. As seen in FIG. 5, transfer conveyor 16 is oriented such that belts 28b are aligned with and advance in the same direction as the direction of the conveying surface of conveyor 17, although transfer conveyor 16 may be oriented such that rollers 26b are aligned with the direction of conveyor 17. Rollers 26b are brought into engagement with case 3a with belts 28b ceasing to engage case 3a. Rollers 26b advance case 3a in the direction of arrow 16b, onto conveyor 18. It is noted that upon initiation of this movement of case 3a in the direction of arrow 16b, the angular orientation of case 3a has changed by ninety degrees counterclockwise (from the top) and case 3a has returned to its initial angular orientation. Conveyor 18 advances case 3a along the secondary conveying path and discharges it onto transfer conveyor 13.

Figure 7:
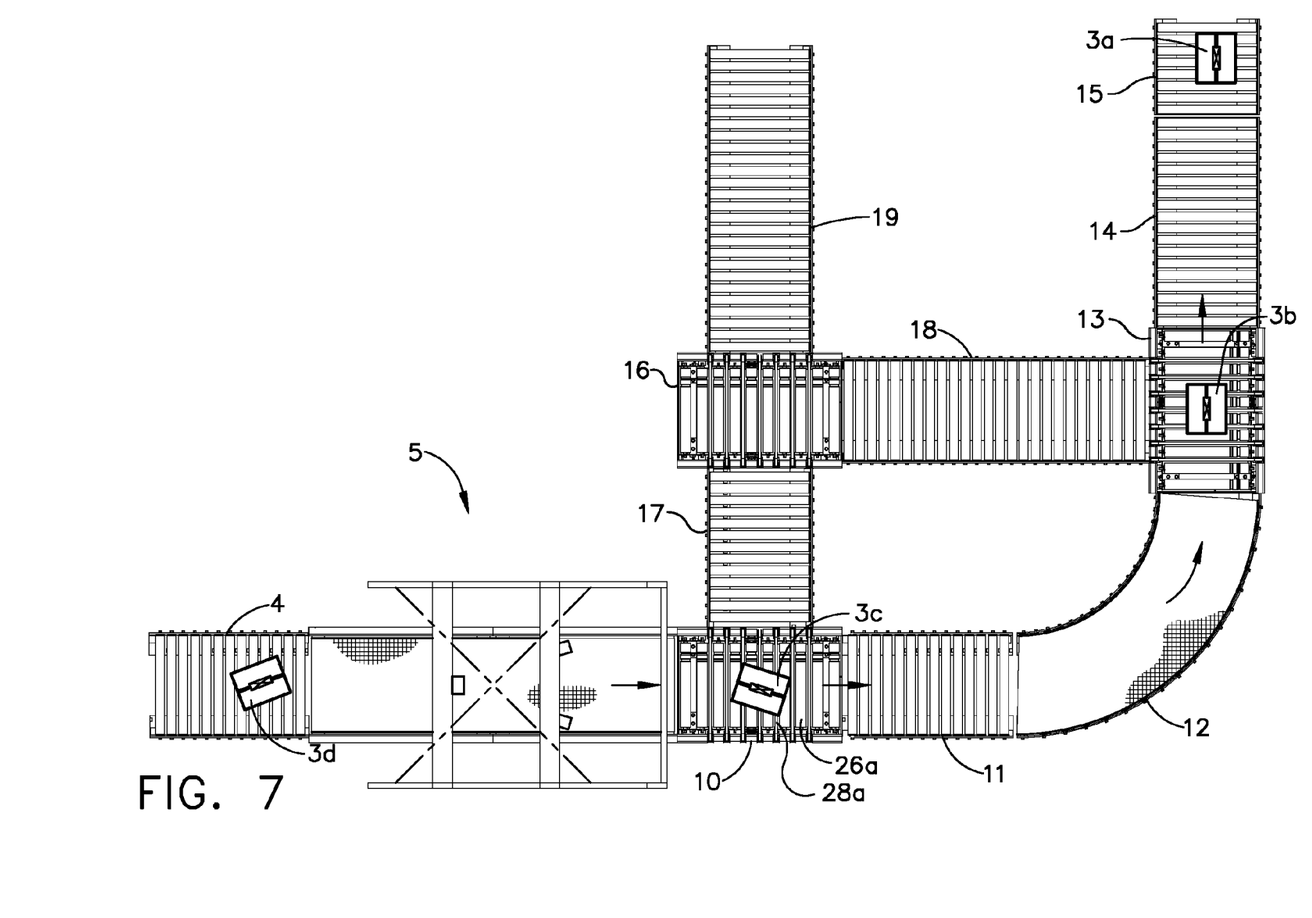
FIG. 7 is a top plan view of the case turner loop of FIG. 6 showing additional case movement.

FIG. 6 illustrates case 3a completely on transfer conveyor 13, aligned with conveyor 14. In the embodiment depicted, transfer conveyor 13 has the same construction as transfer conveyor 10, but it may be of any suitable configuration. As seen in FIG. 6, transfer conveyor 13 is oriented such that belts 28c are aligned with and advance in the same direction as the direction of the conveying surface of conveyor 18, although transfer conveyor 13 may be oriented such that rollers 26c are aligned with the direction of conveyor 18. Rollers 26c are brought into engagement with case 3a with belts 28c ceasing to engage case 3a. Rollers 26c advance case 3a in the direction of arrow 13a, onto conveyor 14. It is noted that upon initiation of this movement of case 3a in the direction of arrow 13a, the angular orientation of case 3a has changed by ninety degrees clockwise (from the top). FIG. 7 illustrates case 3a discharged to downstream system 15 in the desired angular orientation.

In FIG. 4, case 3b is illustrated on conveyor 7 having an initial angular orientation which is the desired angular orientation for downstream system 15. Thus the control system 20 of case turner subsystem 2 will cause transfer conveyor 10 to advance case 3b along the primary conveying path to downstream system 15, without a change in its angular orientation. FIG. 6 illustrates case 3b on an arcuate portion of conveyor 12, having already been advanced by transfer conveyor 10 to conveyor 11 and therefrom to conveyor 12. Conveyor 12 may be of any suitable configuration which maintains the orientation of cases advanced thereby without changing the cases respective angular orientations. In the embodiment depicted, conveyor 12 is a belt conveyor, but could be live roller conveyor, such as with tapered rollers, driven by any suitable means, such as by an underlying belt or comprising an MDR conveyor.

Figure 8:
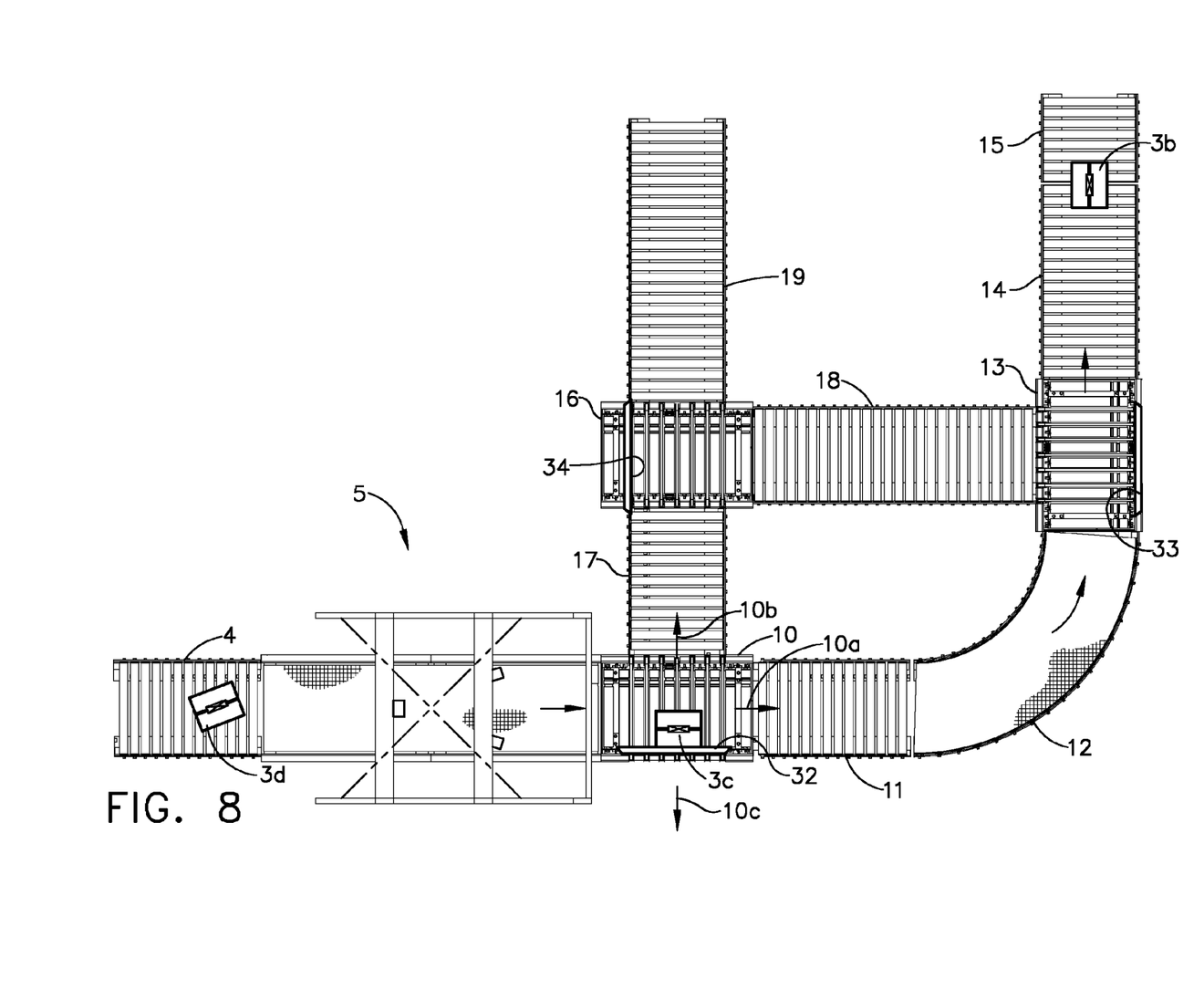
FIG. 8 is a top plan view of the case turner loop of FIG. 7 showing additional case movement.

It is noted that the length of conveyor 11, and even its presence, depends on the physical dimensions of case turner subsystem 2 such as the length of conveyor 18 and the radius and length of conveyor 12. For example, if conveyor 18 were shortened by the length of conveyor 11, conveyor 11 could be omitted altogether, and conveyor 12 disposed immediately adjacent transfer conveyor 10. Conveyor 11 and conveyor 12 advance cases along the primary conveying path without changing the respective angular orientations of the cases. The arcuate portion of conveyor 12 changes the orientation of the direction of travel of the primary conveying path without changing the angular orientation of cases traveling thereupon that are traveling along the primary conveying path. Thus, as seen in FIG. 7, when case 3b reaches transfer conveyor 13, it still has the desired orientation for downstream system 15. Case 3b is discharged from conveyor 12 onto rollers 26c of transfer conveyor 13 which may advance case 3b without stopping, discharging it to conveyor 14. As seen in FIG. 8, case 3b is discharged from conveyor 14 to downstream system 15 in the desired orientation.

As seen in FIGS. 6 and 7, case 3c is skewed—neither edge is aligned with the direction of travel. Case turner subsystem 2 is configured to unskew skewed cases by truing the case edge, where after the case can be advanced along the primary conveying path if its post truing angular orientation is the desired orientation for downstream system 15, or diverted to the secondary conveying path if its post truing angular orientation is not the desired orientation for downstream system 15.

Case 3c has been determined to be skewed by the profiler 5. As seen in FIG. 7, case 3c has reached a central location on transfer conveyor 10. To true the edge of case 3c, belts 28a are brought into engagement with case 3c with rollers 26a ceasing to engage case 3c. Belts 28a are driven to move case 3c in the direction of arrow 10c, urging case 3c against wall 32 with force sufficient to cause case 3c to rotate such that the edge of case 3c proximal wall 32 is parallel to wall 32. If the angular orientation of case 3c is the desired angular orientation for downstream system 15, case 3c may remain proximal wall 32 or belts 28a may move case 3c in the direction of arrow 10b, such as to a generally centrally located position on transfer conveyor 10, and rollers 26a will engage case 3c and belts 28a will disengage case 3c. Rollers 26a will then advance case 3c along the primary conveying path onto conveyor 11. If after truing case 3c, its angular orientation was not the desired angular orientation for downstream system 15, belts 28a may remain in engagement with case 3c and divert case 3c onto the secondary conveying path, which may be done in a single continuous movement without belts 28a stopping.

It is noted that a similar alignment procedure may be done by transfer conveyor 16 advancing a case against wall 34, or transfer conveyor 13 advancing a case against wall 33. Although in the embodiment depicted, the desired angular orientation for downstream system 15 has an edge of the case oriented parallel to the direction of travel, case turner subsystem 2 may be configured to align an edge of the cases with any desired orientation. For example walls 32, 33 or 34, which in the embodiment depicted, are disposed parallel to the direction of travel, could be disposed at a non-parallel orientation relative to the direction of travel so that cases may be oriented to a desired orientation which is not parallel to the direction of travel. If desired, the angular orientation of walls 32, 33 or 34 could be controllably and selectively varied. Orienting surfaces other than solid walls could be used to serve the same function as walls 32, 33, 34. Such orienting surface configurations include non-planar surfaces, non-uniform surfaces, surfaces configured to conform to a shape of the articles, and such surfaces could be continuous or non-continuous surfaces. Regardless of the specific configuration, such orienting surfaces are configured to oriented articles in the desired orientation when such articles are urged with sufficient force or energy against such orienting surface.

As illustrated in FIGS. 4-9, cases 3a, 3b, 3c entered case turner subsystem 2 in an ordered sequence and that order was maintained even though case 3a was diverted along the secondary conveying path and then inducted back into the primary conveying path.

Figure 9:
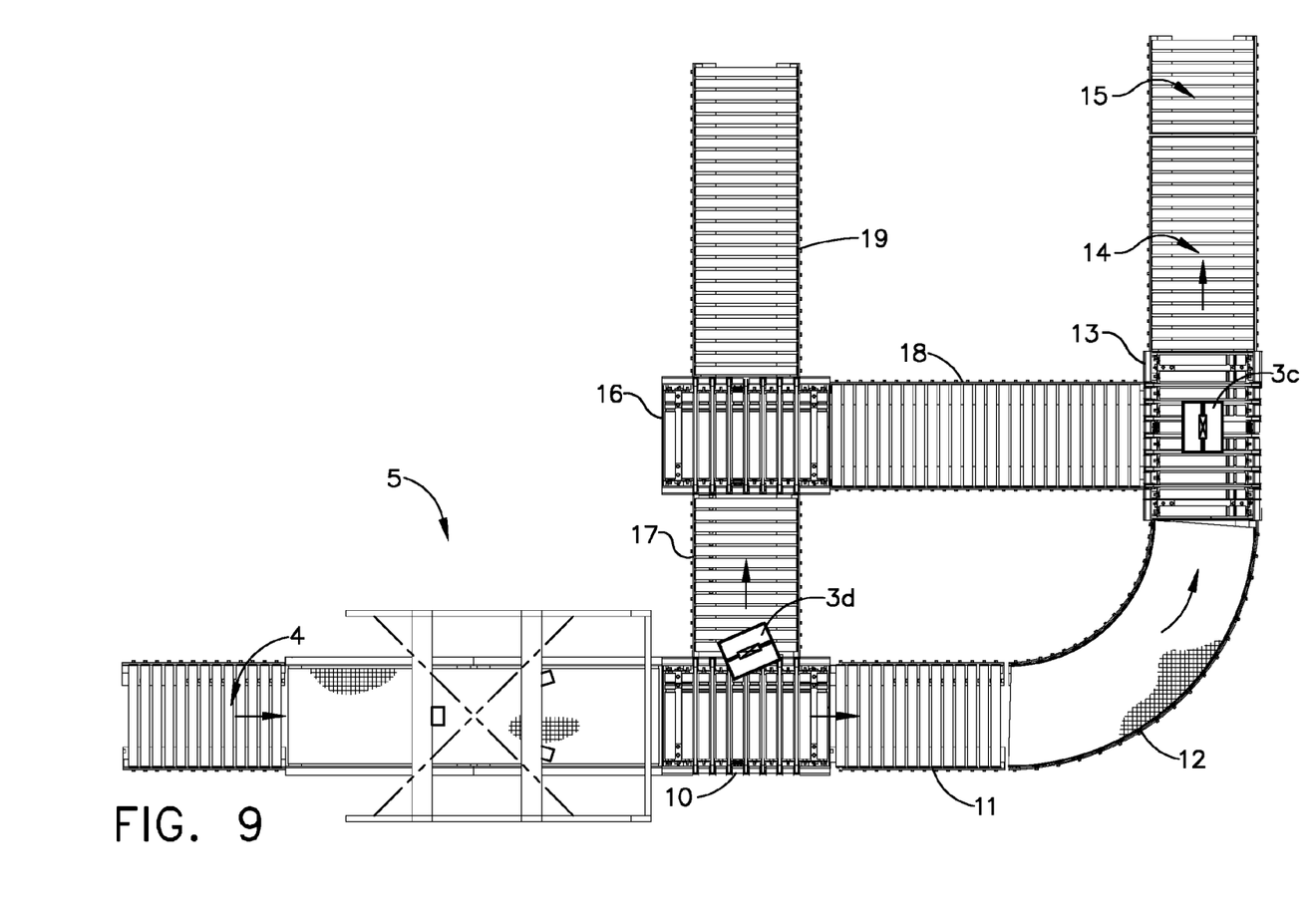
FIG. 9 is a top view of the case turner loop of FIG. 8 showing additional case movement.
Figure 10:
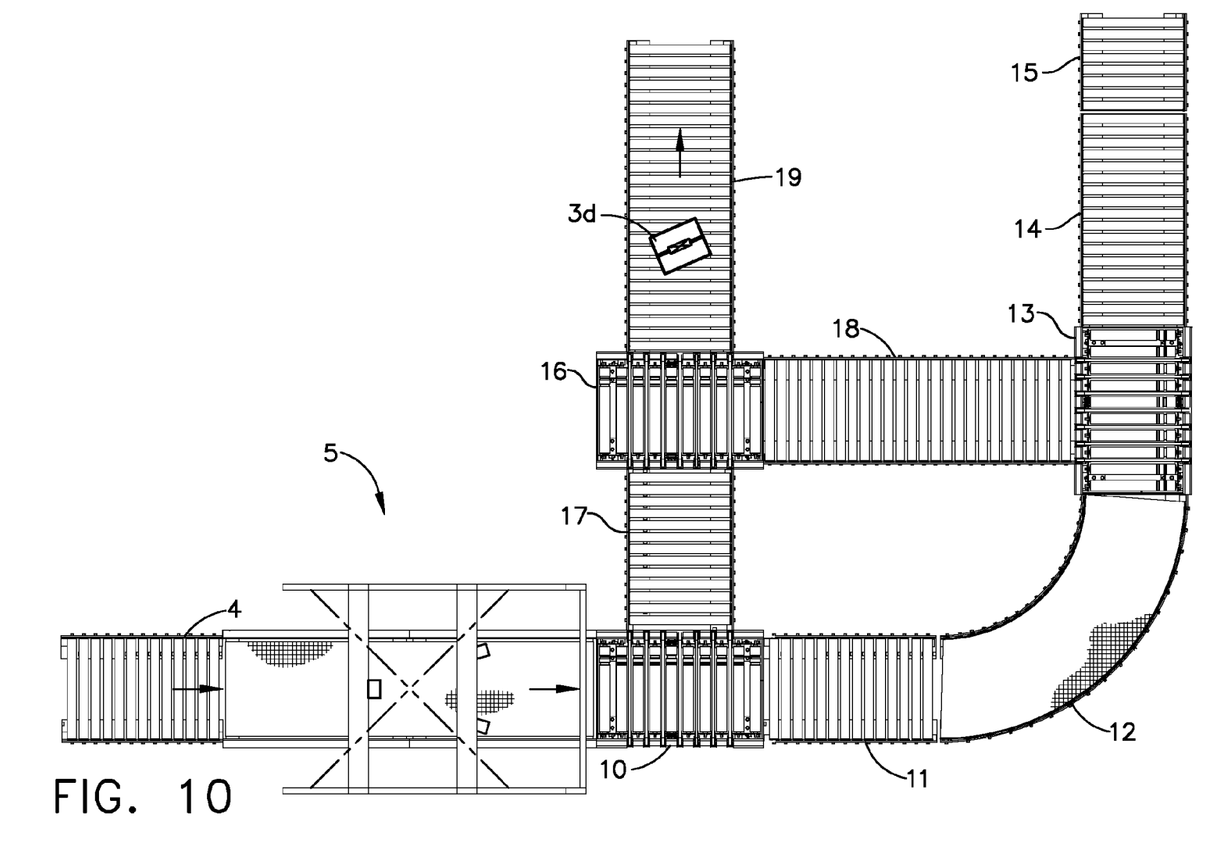
FIG. 10 is a top plan view of the case turner loop of FIG. 9 s showing additional case movement.

Case turner subsystem 2 may comprise an alternative conveying path along which reject cases may be ejected from the case turner subsystem 2. The alternative conveying path may intersect with either the primary conveying path or the secondary conveying path to receive reject cases therefrom. Cases 3 selected for rejection are identified for rejection by scanning system 6, as described above. In the embodiment depicted, a first end of the alternative conveying path intersects the secondary path intermediate the first and second ends of the secondary conveying path, at transfer conveyor 16. As seen in FIG. 9, at transfer conveyor 10, case 3d is diverted by transfer conveyor 10 onto conveyor 17, without truing the edge (since case 3d is being advanced to reject conveyor 19). FIG. 10 illustrates case 3d on reject conveyor 19, having been advanced by transfer conveyor 16 thereto. Rejected cases such as case 3d can be saved on the reject conveyor for later disposition. Reject conveyor 19 may be configured to hold several cases, for example ten cases, or may be configured to convey the rejected cases to a downstream system.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Explicit Definitions

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated.

Although the conveying system is referred to as a case turner subsystem it is not limited to a conveying system which handles cases, but may handle any type of article. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the preferred embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

The invention claimed is:

1. A conveying system for advancing a plurality of articles and for selectively reorienting selected ones of the plurality of articles to a desired angular orientation, the conveying system comprising:
   a first right angle transfer conveyor comprising a first conveying surface and a second conveying surface which are selectively actuatable, the first conveying surface configured to discharge articles in a first direction of travel when the first conveying surface is actuated; the second conveying surface configured to discharge articles in a second direction of travel when the second conveying surface is actuated;
   a first conveyor disposed to receive articles discharged from the first conveying surface of the first right angle transfer conveyor, the first conveyor comprising an arcuate section, the first conveyor configured to discharge articles in the first direction of travel;
   a second conveyor disposed to receive respective articles discharged from the second conveying surface of the first right angle transfer conveyor and to discharge articles in the second direction of travel;
   a second right angle transfer conveyor comprising a first conveying surface and a second conveying surface which are selectively actuatable, the first conveying surface configured to receive articles discharged from the second conveyor, the second conveying surface configured to discharge articles when actuated in a third direction of travel;
   a third conveyor disposed to receive articles discharged from the second conveying surface of the second right angle transfer conveyor and to discharge articles in the third direction of travel; and
   a third right angle transfer conveyor comprising a first conveying surface and a second conveying surface which are selectively actuatable, the first conveying surface configured to receive articles discharged from the third conveyor, the second conveying surface configured to receive articles from the first conveyor and configured to discharge articles when actuated in the first direction of travel.

2. The conveying system of claim 1, comprising a fourth conveyor disposed between the first right angle transfer conveyor and the first conveyor, the fourth conveyor disposed to directly receive articles discharged from the first conveying surface of the first right angle transfer conveyor, and to discharge the articles directly to the first conveyor.

3. The conveying system of claim 1, wherein the each respective article received by the first conveyor has a respective first angular orientation, and the first conveyor is configured to discharge each the respective article in the first angular orientation.

4. The conveying system of claim 1, wherein the first conveyor is configured to change the orientation of the first direction of travel by 90°.

5. The conveying system of claim 1, comprising a secondary conveying path of travel of the articles, the secondary conveying path defined by the first right angle transfer conveyor, the second conveyor, the second right angle transfer conveyor, the third conveyor and the third right angle transfer conveyor, the secondary path configured to reorient articles traveling therealong to the desired angular orientation.

6. The conveying system of claim 5, wherein the secondary conveying path is configured to reorient articles traveling therealong to an intermediate angular orientation prior to reorienting articles to the desired angular orientation.

* * * * *